May 12, 1953          E. L. KELL          2,638,308

SAFETY VALVE FOR AIR BRAKE SYSTEMS AND THE LIKE

Filed Dec. 23, 1947

INVENTOR.
EUGENE L. KELL

BY Taylor and Lemagne

ATTORNEYS

Patented May 12, 1953

2,638,308

UNITED STATES PATENT OFFICE 2,638,308

SAFETY VALVE FOR AIR BRAKE SYSTEMS
AND THE LIKE

Eugene L. Kell, San Francisco, Calif.

Application December 23, 1947, Serial No. 793,416

5 Claims. (Cl. 251—121)

An object of the present invention is to provide an improved safety valve for air brake systems and the like.

Another object of the invention is to provide an improved safety valve of the ball-check type for air brake systems and the like, wherein the improvements are comprised of certain critical form and size relationships of the internal surfaces of the valve, defining the valve spaced, with each other and with the inlet and outlet orifices and ball element.

I am aware of the fact that various forms of check valves have been utilized in air brake systems and similar environments for the purpose of preventing the flow of pressurized air therethrough in the event of a break occurring in that portion of a pneumatic line between the valve and an air brake. Conventional valves of this form comprise a coupling-type housing having an inlet in one end, an outlet oppositely disposed thereto, and a ball carried in the housing below the level of the inlet and outlet. A break in the line at the downstream side of the valve causes the pressurized air in the line to move rapidly through the valve toward the break, and this increased velocity of the air stream correspondingly reduces the pressure in the air stream, with the result that the ball is urged by unbalanced pressure forces to enter the air stream and seat in the outlet orifice, thereby cutting off the flow of air from the valve.

The present invention constitutes a valve of the above-described type, but one having improved operating characteristics and enhanced efficiency due to a critical configuration of the space defined by the internal surfaces of the valve body and the dimensional relationship between this internal space of the valve, the ball, and the valve orifices. The internal space of the valve is characterized by a dome portion located above the oppositely disposed inlet and outlet orifices and having a height approximately equal to the diameter of the valve ball. Adjacent the inlet orifice and oppositely disposed to the dome space is a well or recess for the ball, said well being of such depth that the upper surface of the ball, when located therein, is such that it does not extend above the lower edge of the inlet orifice. The valve space is further defined by an angularly inclined internal surface of the valve casing extending from the well to the outlet orifice. When the ball is located in the well, an imaginary projection of this angularly inclined surface would intersect substantially the mass center of the ball.

The valve is further characterized by the provision of a stop bar or pin transversely of the inlet orifice, said pin being effective to split the stream of air entering the valve to set up turbulence conditions in the dome portion of the internal space of the valve for optimum efficiency of operation of the valve ball.

Further structural characteristics and advantages of the valve of the invention will be apparent from the drawing forming a part of the specification, and in which.

Figure 1:
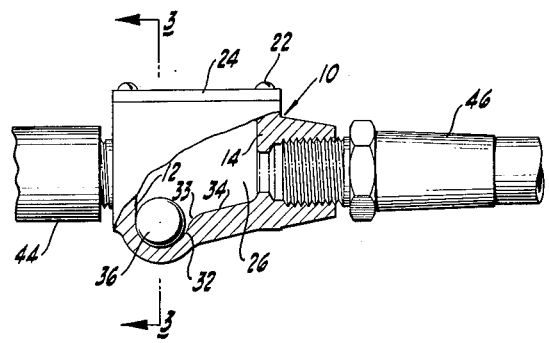
Figure 1 is a view in side elevation, partly broken away, of the valve embodying the invention.
Figure 2:
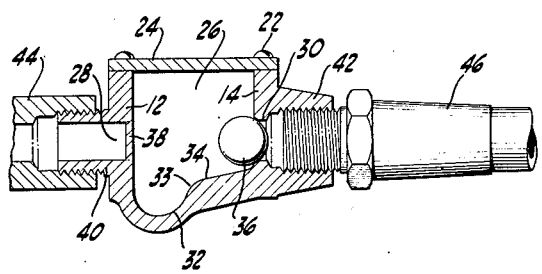
Figure 2 is a longitudinal sectional view in side elevation of the valve.
Figure 3:
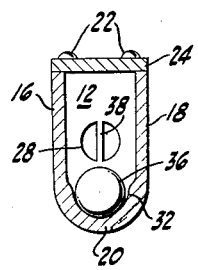
Figure 3 is a view in section taken along lines 3—3 of Figure 1.

Referring to the drawing for more specific details of the invention, 10 indicates generally a valve body having end walls 12 and 14, side walls 16 and 18, and a bottom wall 20. Secured to the upper edges of the side and end walls, as by screws 22, is a closure plate 24. The walls and closure plate define an internal space 26 having a substantial portion thereof above oppositely disposed and substantially equi-sized inlet and outlet orifices 28 and 30 formed in the end walls 12 and 14, respectively. The internal surface of the bottom wall 20 is formed to provide a ball recess, or well, 32 having a bevelled edge 33 and an angularly inclined surface 34 extending from the recess 32 to end wall 14 immediately below outlet orifice 30. A ball 36 resides within the valve body, normally within the recess 32. The valve is further provided with a stop bar 38 across the inlet orifice 28, and with an externally threaded nipple 40 and an internally threaded nipple 42, said nipples being respectively engaged with a pneumatic line 44 leading to a source of pressurized air, not shown, and with a pneumatic line 46 leading to an air brake, or like pressure-responsive device, also not shown.

It will be noted that the height of that portion of the internal space 26 above the orifices 28 and 38 is substantially equal to the diameter of the ball 36, and that the upper surface of the ball, when residing in the recess 32, is slightly below the lower margin of the inlet orifice 28. It will be further noted that when the ball 36 is within the well 32 its mass center is in substantial alignment with the angularly inclined surface 34.

The valve is operative in the following manner: Whenever the air within the space 26 reaches a predetermined velocity in passing from the inlet orifice 28 to the outlet orifice 30, as would occur upon a break or rupture of line 46, the ball 36 is lifted by the resulting pressure differential in the space 26 upwardly and over the bevelled edge 33 of the well 32, and then along the angularly inclined surface 34 to seat in the outlet orifice 30 and shut off the flow of air through the valve. The provision of well 32 insures that no valving action of the ball will take place until the pressure differential in the space 26 is substantially equal to the weight of the ball while the provision of inclined surface 34 is for the purpose of redirecting the ball to the well when the break in line 46 is repaired, or the pressure source is valved off from line 44. However, to insure optimum efficiency of operation of the valve, it is necessary that the dome space, or that portion above the orifices 28 and 30, be provided and that it be of a height substantially equal to the diameter of the ball. It is believed that turbulence within this dome space, or possibly a pressure-cushion effect, is the phenomenon contributing to the efficiency of operation of the valve. In any case, the efficiency of the operation of the valve results essentially from the combination of the well, the angularly inclined surface 34, and the dome space, and, more specifically, from the relative dimensions of these three elements. The efficiency of operation of the valve is further enhanced by the stop bar 38 which serves to split the inlet air stream to contribute to the turbulence within the dome space, thus making the valve ball more efficiently operative in its travel from the well to the outlet orifice.

The bar 38 across the inlet orifice 28 serves a further and necessary function in the proper and efficient operation of the valve, namely, that of preventing the ball from seating in the inlet orifice when the air pressure in line 44 is released.

While the preferred embodiment of the invention has been shown and described, it is to be understood that this embodiment is subject to modification within the spirit of the invention and the scope of the appended claims.

What I claim as new and desire to secure by Letters Patent is:

1. A check valve for use in a fluid line operable to inhibit the passage of fluid therethrough when the flow rate of the fluid reaches a predetermined velocity, said valve comprising a hollow body defining therein a valve space, an inlet orifice at one end of said body communicating with the valve space, an outlet orifice at the other end of said body communicating with the valve space, said outlet orifice being disposed opposite said inlet orifice and being substantially the same size as said inlet orifice, a well formed within said body in alignment with said orifices, said well being laterally offset with respect to said orifices and being located in closer proximity to said inlet orifice than to said outlet orifice, a ball disposed within said body, said ball being complementary to said well and being seatable in said outlet orifice, an angularly inclined surface within said body extending from said well to a point adjacent the edge of said outlet orifice, said valve space having a portion, laterally offset from said orifices in a direction of offset opposed to the direction of offset of said well, said portion having a dimension in its direction of offset approximately equal to the diameter of said ball.

2. A check valve for use in a fluid line operable to inhibit the passage of fluid therethrough when the flow rate of the fluid reaches a predetermined velocity, said valve comprising a hollow body defining therein a valve space, an inlet orifice at one end of said body communicating with the valve space, an outlet orifice at the other end of said body communicating with the valve space, said outlet orifice being disposed opposite said inlet orifice and being substantially the same size as said inlet orifice, a well formed within said body in alignment with said orifices, said well being laterally offset with respect to said orifices and being located closely adjacent said inlet orifice, a ball disposed within said body, said ball being complementary to said well, being adapted to reside freely therein, and being seatable in said outlet orifice, said ball, when within said well, being slightly offset from said inlet orifice, an angularly inclined surface within said body extending from said well to a point adjacent the edge of said outlet orifice, said inclined surface being in substantial alignment with the mass center of said ball when said ball is within said well, said valve space having a portion, laterally offset from said orifices in a direction of offset opposed to the direction of offset of said well, said portion having a dimension in its direction of offset substantially equal to the diameter of said ball.

3. In a check valve as set forth in claim 2, a bar arranged transversely of the inlet orifice to split the fluid stream passing into the valve space.

4. A check valve for use in a fluid line operable to inhibit the passage of fluid therethrough when the flow rate of the fluid reaches a predetermined velocity, said valve comprising a hollow body defining therein a valve space, an inlet orifice at one end of said body communicating with the valve space, an outlet orifice at the other end of said body communicating with the valve space, said outlet orifice being disposed opposite said inlet orifice and being substantially the same size as said inlet orifice, a well formed within said body, said well being laterally offset with respect to said orifices, a ball disposed within said body, said ball being complementary to said well, being adapted to reside freely therein, and being seatable in said outlet orifice, an angularly inclined surface within said body extending from said well to a point adjacent the edge of said outlet orifice, said valve space having a portion, laterally offset from said orifices in a direction of offset opposed to the direction of offset of said well, said portion having a dimension in its direction of offset approximately equal to the diameter of said ball.

5. A check valve for use in a fluid line operable to inhibit the passage of fluid therethrough when the flow rate of the fluid reaches a predetermined velocity, said valve comprising a hollow body defining therein a valve space, an inlet orifice at one end of said body communicating with the valve space, an outlet orifice at the other end of said body communicating with the valve space, said outlet orifice being disposed opposite said inlet orifice and being substantially the same size as said inlet orifice, a well formed within said body, said well being laterally offset with respect to said orifices, a ball within said body, said well being of sufficient depth to accommodate the ball so that the ball will not protrude into the fluid stream path defined by the inlet and outlet orifices, said valve space having a portion, laterally offset from said orifices in a direction of offset opposed to the direction of offset of said well, said portion having a dimension in its direction of offset at least as great as the diameter of said ball, and a fluid turbulizing bar located in the inlet orifice and extending diametrically thereof.

EUGENE L. KELL.

References Cited in the file of this patent

UNITED STATES PATENTS

| Number | Name | Date |
|---|---|---|
| 398,111 | Abbott | Feb. 19, 1889 |
| 833,581 | Cousin | Oct. 16, 1906 |
| 1,339,383 | Beese | May 11, 1920 |
| 1,658,099 | Reardon | Feb. 7, 1928 |
| 1,786,848 | Johnson | Dec. 30, 1930 |
| 2,475,585 | Baird | July 12, 1949 |

FOREIGN PATENTS

| Number | Country | Date |
|---|---|---|
| 1,624 | Great Britain | of 1911 |
| 97,900 | Germany | of 1898 |
| 166,883 | Switzerland | of 1934 |
| 538,306 | France | of 1922 |
| 551,386 | Great Britain | of 1943 |